(12) United States Patent
Ye et al.

(10) Patent No.: US 12,085,096 B2
(45) Date of Patent: Sep. 10, 2024

(54) INDIRECT HYDRAULIC LOAD HIERARCHICAL CONTROL SYSTEM AND METHOD FOR WAVE ENERGY DEVICE

(71) Applicant: GUANGZHOU INSTITUTE OF ENERGY CONVERSION, CHINESE ACADEMY OF SCIENCES, Guangzhou (CN)

(72) Inventors: Yin Ye, Guangzhou (CN); Songwei Sheng, Guangzhou (CN); Wensheng Wang, Guangzhou (CN); Kunlin Wang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 18/685,233

(22) PCT Filed: Apr. 28, 2023

(86) PCT No.: PCT/CN2023/091531
§ 371 (c)(1),
(2) Date: Feb. 21, 2024

(87) PCT Pub. No.: WO2023/179803
PCT Pub. Date: Sep. 28, 2023

(65) Prior Publication Data
US 2024/0263608 A1      Aug. 8, 2024

(30) Foreign Application Priority Data
Jun. 6, 2022 (CN) .......................... 202210634972.0

(51) Int. Cl.
*F03B 13/18* (2006.01)
*F15B 1/04* (2006.01)
(Continued)

(52) U.S. Cl.
CPC ................ *F15B 1/04* (2013.01); *F15B 13/06* (2013.01); *F03B 13/14* (2013.01); *F03B 13/189* (2013.01);
(Continued)

(58) Field of Classification Search
CPC ........ F03B 13/14; F03B 13/189; F03B 13/22; F15B 1/04; F15B 13/03; F15B 2201/51; Y02E 10/30; F05B 2260/406
See application file for complete search history.

(56) References Cited

U.S. PATENT DOCUMENTS 4,742,241 A * 5/1988 Melvin ................. F03B 13/187
60/495
4,931,662 A * 6/1990 Burton ................. F03B 13/1815
60/507

(Continued)

FOREIGN PATENT DOCUMENTS

| CN | 102588378 A | 7/2012 |
|---|---|---|
| CN | 106194858 A | 12/2016 |

(Continued)

*Primary Examiner* — Dustin T Nguyen
(74) *Attorney, Agent, or Firm* — Bayramoglu Law Offices LLC (57) ABSTRACT

An indirect hydraulic load hierarchical control system and method for a wave energy device includes a first hydraulic cylinder group, a second hydraulic cylinder group, a third hydraulic cylinder group, a high-pressure energy accumulator group, a pressure detection control module, a first hydraulic power generator set, a second hydraulic power generator set and a third hydraulic power generator set. A detection end of the pressure detection control module is used for acquiring an internal pressure of the high-pressure energy accumulator group, comparing the internal pressure with a preset pressure level, and respectively controlling the on-off of reversing valves and electromagnetic valves according to a comparison result. The present invention has (Continued)

the beneficial effects that all hydraulic loads can be automatically loaded or automatically unloaded, so that the wave energy device operates in a full load state or in an optimal energy conversion efficiency state.

2 Claims, 7 Drawing Sheets

(51) Int. Cl.
    *F15B 13/06*     (2006.01)
    *F03B 13/14*     (2006.01)
    *F03B 13/22*     (2006.01)

(52) U.S. Cl.
    CPC ......... *F03B 13/22* (2013.01); *F05B 2260/406* (2013.01); *F15B 2201/51* (2013.01); *Y02E 10/30* (2013.01)

(56) References Cited

U.S. PATENT DOCUMENTS

| | | | | |
|---|---|---|---|---|
| 7,956,479 | B1* | 6/2011 | Bergman | F03B 13/187 |
| | | | | 290/53 |
| 10,571,088 | B2* | 2/2020 | Dalsgaard | F21S 10/026 |
| 11,008,999 | B2* | 5/2021 | Maruyama | F03B 15/00 |
| 11,933,262 | B2* | 3/2024 | Mundon | F15B 21/0423 |
| 2009/0008941 | A1* | 1/2009 | Irti | F03B 13/24 |
| | | | | 290/53 |
| 2020/0254888 | A1* | 8/2020 | Weiss | F15B 15/00 |

FOREIGN PATENT DOCUMENTS

| | | |
|---|---|---|
| CN | 106321334 A | 1/2017 |
| CN | 206159140 U | 5/2017 |
| CN | 115095557 A | 9/2022 |
| WO | 2015163641 A1 | 10/2015 |

\* cited by examiner

INDIRECT HYDRAULIC LOAD HIERARCHICAL CONTROL SYSTEM AND METHOD FOR WAVE ENERGY DEVICE

CROSS REFERENCE TO RELATED APPLICATIONS

This application is a national stage entry of International Application No. PCT/CN2023/091531, filed on Apr. 28, 2023, which is based upon and claims foreign priority to Chinese Patent Application No. 202210634972.0, filed on Jun. 6, 2022, the entire contents of which are incorporated herein by reference.

TECHNICAL FIELD

The present invention relates to the technical field of hydraulic power generation control for wave energy devices, and in particular to an indirect hydraulic load hierarchical control system and method for a wave energy device.

BACKGROUND

The conversion process of a conventional hydraulic wave energy device is as follows: under the driving of waves, a wave-absorbing floating body drives a hydraulic cylinder installed therewith to reciprocate, and the hydraulic cylinder pumps hydraulic oil into a high-pressure energy accumulator group during the reciprocating movement, that is, wave energy is converted into hydraulic energy, which is called one-stage energy conversion. When the pressure of the energy accumulator group reaches a set pressure, a control valve group is started, the high-pressure hydraulic oil in the energy accumulator group is released to impact a hydraulic motor to make the same rotate, and the hydraulic energy is converted into rotary mechanical energy, which is called two-stage energy conversion. The hydraulic motor drives a power generator coaxially connected therewith to rotate for power generation, and the rotary mechanical energy is converted into electric energy, which is called three-stage energy conversion.

The one-stage energy conversion process of the wave energy device is a mechanical vibration process. In this process, there is an optimal wave capture efficiency under each of different wave forces, and this efficiency corresponds to an optimal hydraulic load, that is, a work damping force of the hydraulic cylinder, which is an effective work area of the hydraulic cylinder multiplied by the energy accumulator pressure. Under the condition of the set pressure of the energy accumulator, the one-stage energy conversion efficiency is optimized by adjusting the effective work area of the hydraulic cylinder, that is, adjusting the load number of the hydraulic cylinders. Therefore, how to make the wave energy device automatically select the corresponding hydraulic load according to the wave size, that is, how to independently select the number of hydraulic cylinders which do work effectively, has become a key factor to improve the power generation efficiency of the wave energy device. The so-called hydraulic cylinder which does work effectively means that an oil outlet of the hydraulic cylinder is connected into the high-pressure energy accumulator group, and a hydraulic cylinder which does work ineffectively means that the oil outlet of the hydraulic cylinder is connected into a low-pressure loop and does not participate in work.

At present, for most wave energy devices, the hydraulic load is mainly manually adjusted, and then the direction of the oil outlet of the hydraulic cylinder is controlled by artificially judging the wave size. There are few reports on the control technologies allowing the wave energy device to adjust the hydraulic load independently according to the wave size. In view of this, the applicant has previously applied for the invention patent "HYDRAULIC AUTOMATIC HIERARCHICAL LOADING CONTROLLER for WAVE ENERGY DEVICE" (application No. CN201610614272.X). The controller needs to measure wave power by additionally increasing multiple hydraulic apparatuses. A measuring system is independent of an energy conversion system, and a control accuracy of the controller is related to a flow regulating valve. In actual operation, since it is difficult for the flow regulating valve to accurately adjust the flow and even slight vibration will cause the change of a flow-pressure characteristic curve of the flow regulating valve, the effect of the system in practical application is not ideal.

SUMMARY

Regarding the above problems, the present invention provides an indirect hydraulic load hierarchical control system and method for a wave energy device, which indirectly and automatically measure the wave size through its own energy conversion system, and independently select the hydraulic load size according to the wave size, so as to improve the one-stage energy conversion efficiency of the wave energy device and achieve high operability.

To solve the above technical problems, in a first aspect of the present invention, an indirect hydraulic load hierarchical control system for a wave energy device is provided, which includes a first hydraulic cylinder group, a second hydraulic cylinder group, a third hydraulic cylinder group, a high-pressure energy accumulator group, a pressure detection control module, a first hydraulic power generator set, a second hydraulic power generator set and a third hydraulic power generator set, wherein an output end of the first hydraulic cylinder group is directly connected with an input end of the high-pressure energy accumulator group, an output end of the second hydraulic cylinder group and an output end of the third hydraulic cylinder group are connected with the input end of the high-pressure energy accumulator group and an oil return tank through independent reversing valves respectively, an output end of the high-pressure energy accumulator group is respectively connected with the first hydraulic power generator set, the second hydraulic power generator set and the third hydraulic power generator set through independent electromagnetic valves, a detection end of the pressure detection control module is used for acquiring an internal pressure of the high-pressure energy accumulator group, comparing the internal pressure with a preset pressure level, and respectively controlling the on-off of the reversing valves and the electromagnetic valves according to a comparison result, the reversing valves are used for controlling the second hydraulic cylinder group and the third hydraulic cylinder group to enter/exit an effective work state, and the electromagnetic valves are used for controlling the first hydraulic power generator set, the second hydraulic power generator set and the third hydraulic power generator set to enter/exit a power generation state.

In a second aspect of the present invention, An indirect hydraulic load hierarchical control method for a wave energy device is provided, which is used for the above indirect hydraulic load hierarchical control system for the wave energy device and includes: acquiring an internal pressure P of the high-pressure energy accumulator group in real time, and setting gradually increasing pressure values P1, P2, P3, P4, P5 and P6, and gradually increasing pressure values P21, P22, P31 and P32, wherein the following pressure relationships need to be met: P1<P21<P3<P31<P5 and P2<P22<P4<P32<P6;

the control method includes a first mode, a second mode, a third mode, a fourth mode and a fifth mode, and each mode may only be switched to an adjacent mode every time;

in the first mode, if P2≤P<P22, the second hydraulic cylinder group and the third hydraulic cylinder group are triggered to be connected to the oil return tank through the corresponding reversing valves, the electromagnetic valve corresponding to the first hydraulic power generator set is turned on, the electromagnetic valves corresponding to the second hydraulic power generator set and the third hydraulic power generator set are turned off, and after P2≤P<P22 is triggered, the electromagnetic valve corresponding to the first hydraulic power generator set is only allowed to be turned off only under the condition that P≤P1;

in the second mode, if P22≤P<P4, the second hydraulic cylinder group is triggered to be connected to the input end of the high-pressure energy accumulator group through the corresponding reversing valve, the third hydraulic cylinder group is connected to the oil return tank through the corresponding reversing valve, the electromagnetic valve corresponding to the first hydraulic power generator set is turned on, the electromagnetic valves corresponding to the second hydraulic power generator set and the third hydraulic power generator set are turned off, and after P22≤P<P4 is triggered, the second hydraulic cylinder group is only allowed to be controlled to be connected to the oil return tank through the corresponding reversing valve only under the condition that P≤P21;

in the third mode, if P4≤P<P32, the second hydraulic cylinder group is triggered to be connected to the input end of the high-pressure energy accumulator group through the corresponding reversing valve, the third hydraulic cylinder group is connected to the oil return tank through the corresponding reversing valve, the electromagnetic valves corresponding to the first hydraulic power generator set and the second hydraulic power generator set are turned on, the electromagnetic valve corresponding to the third hydraulic power generator set is turned off, and after P4≤P<P32 is triggered, the electromagnetic valve corresponding to the second hydraulic power generator set is only allowed to be turned off only under the condition that P≤P3;

in the fourth mode, if P32≤P<P6, the second hydraulic cylinder group and the third hydraulic cylinder group are triggered to be connected to the input end of the high-pressure energy accumulator group through the corresponding reversing valves, the electromagnetic valves corresponding to the first hydraulic power generator set and the second hydraulic power generator set are turned on, the electromagnetic valve corresponding to the third hydraulic power generator set is turned off, and after P32≤P<P6 is triggered, the third hydraulic cylinder group is only allowed to be controlled to be connected to the oil return tank through the corresponding reversing valve only under the condition that P≤P31; and in the fifth mode, if P≥P6, the second hydraulic cylinder group and the third hydraulic cylinder group are triggered to be connected to the input end of the high-pressure energy accumulator group through the corresponding reversing valves, the electromagnetic valves corresponding to the first hydraulic power generator set, the second hydraulic power generator set and the third hydraulic power generator set are turned on, and after P≥P6 is triggered, the electromagnetic valve corresponding to the third hydraulic power generator set is only allowed to be turned off only under the condition that P≤P5.

The present invention has the beneficial effects that during the instantaneous change of wave impact, all hydraulic loads can be automatically loaded, or automatically unloaded, so that the wave energy device operates in a full load state or in an optimal energy conversion efficiency state, and the motion amplitude of the wave-absorbing floating body can be reduced, thereby reducing the probability of collision between the wave-absorbing floating body and a device base and protecting the wave energy device.

1—first hydraulic cylinder group, 2—second hydraulic cylinder group, 3—third hydraulic cylinder group, 4—high-pressure energy accumulator group, 5—pressure detection control module, 6—first hydraulic power generator set, 7—second hydraulic power generator set, 8—third hydraulic power generator set, 101—first hydraulic cylinder, 102—first check valve, 103—second check valve, 201—second hydraulic cylinder, 202—third check valve, 203—fourth check valve, 204—first two-position three-way reversing valve, 301—third hydraulic cylinder, 302—fifth check valve, 303—sixth check valve, 304—second two-position three-way reversing valve, 501—pressure sensor, 502—first hysteresis comparator, 503—second hysteresis comparator, 504—third hysteresis comparator, 505—fourth hysteresis comparator, 506—fifth hysteresis comparator, 601—first two-position two-way electromagnetic valve, 602—first hydraulic motor, 603—first power generator, 701—second two-position two-way electromagnetic valve, 702—second hydraulic motor, 703—second power generator, 801—third two-position two-way electromagnetic valve, 802—third hydraulic motor, and 803—third power generator.

DETAILED DESCRIPTION OF THE EMBODIMENTS

In order to make the objectives, technical solutions and advantages of the present invention clearer and more definite, the content of the present invention will be further explained in detail in combination with the accompanying drawings and specific embodiments. It may be understood that the specific embodiments described here are only for explaining the present invention, but not for limiting the present invention. In addition, it should be noted that, for the convenience of description, only part of, but not all content, related to the present invention is shown in the drawings.

Embodiment I

Figure 1:
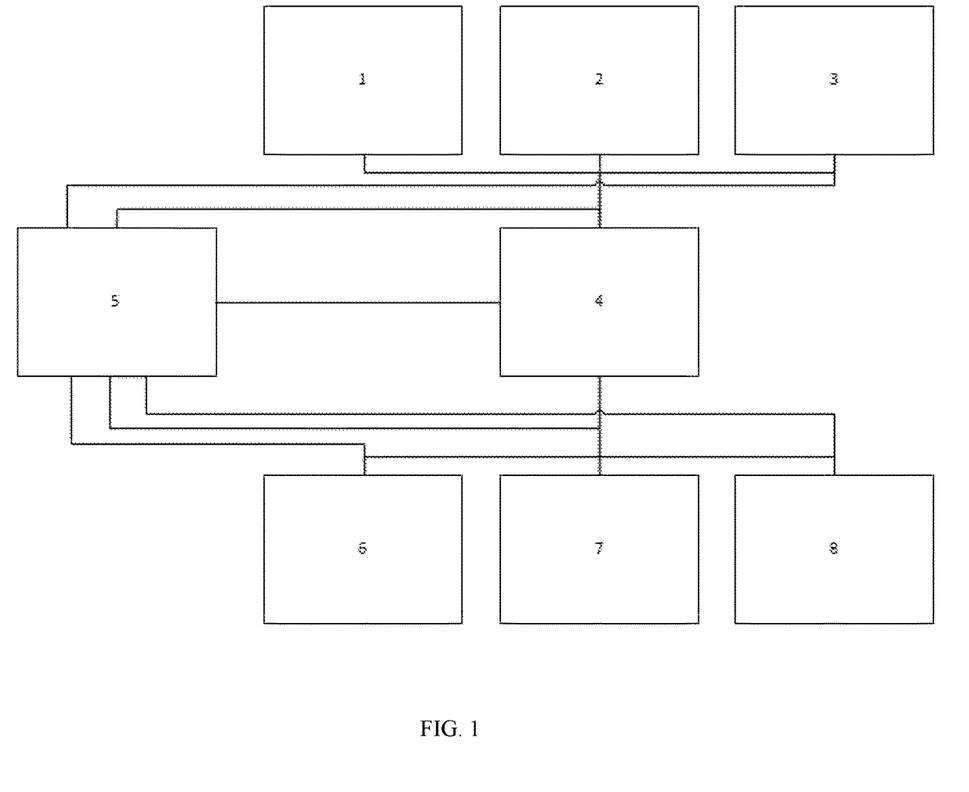
FIG. 1 is a schematic structural diagram of an indirect hydraulic load hierarchical control system for a wave energy device disclosed in Embodiment I of the present invention.

The present embodiment provides an indirect hydraulic load hierarchical control system for a wave energy device. The present embodiment takes three-stage load adjustment, that is, load increase or decrease adjustment of three hydraulic cylinders, as an example. As shown in FIG. 1, the system includes a first hydraulic cylinder group 1, a second hydraulic cylinder group 2, a third hydraulic cylinder group 3, a high-pressure energy accumulator group 4, a pressure detection control module 5, a first hydraulic power generator set 6, a second hydraulic power generator set 7 and a third hydraulic power generator set 8.

An output end of the first hydraulic cylinder group 1 is directly connected with an input end of the high-pressure energy accumulator group 4, an output end of the second hydraulic cylinder group 2 and an output end of the third hydraulic cylinder group 3 are connected with the input end of the high-pressure energy accumulator group 4 and an oil return tank through independent reversing valves respectively, an output end of the high-pressure energy accumulator group 4 is respectively connected with the first hydraulic power generator set 6, the second hydraulic power generator set 7 and the third hydraulic power generator set 8 through independent electromagnetic valves, a detection end of the pressure detection control module 5 is used for acquiring an internal pressure of the high-pressure energy accumulator group 4, comparing the internal pressure with a preset pressure level, and respectively controlling the on-off of the reversing valves and the electromagnetic valves according to a comparison result, the reversing valves are used for controlling the second hydraulic cylinder group 2 and the third hydraulic cylinder group 3 to enter/exit an effective work state, and the electromagnetic valves are used for controlling the first hydraulic power generator set 6, the second hydraulic power generator set 7 and the third hydraulic power generator set 8 to enter/exit a power generation state.

In the present embodiment, an original hydraulic energy conversion system is not greatly changed, only the reversing valves and the pressure detection control module 5 are added, and a logical control strategy is simple and easy to realize. When in design, the power generator power and the hydraulic motor displacement can be calculated according to incoming waves, and appropriate starting and closing pressure can be set for the pressure detection control module 5, so that the wave size can be indirectly and automatically measured by the hydraulic load stage number of the wave energy device, and the hydraulic load size can be adjusted independently according to the wave size, thereby improving the one-stage energy conversion efficiency of the wave energy device.

Embodiment II

Figure 2:
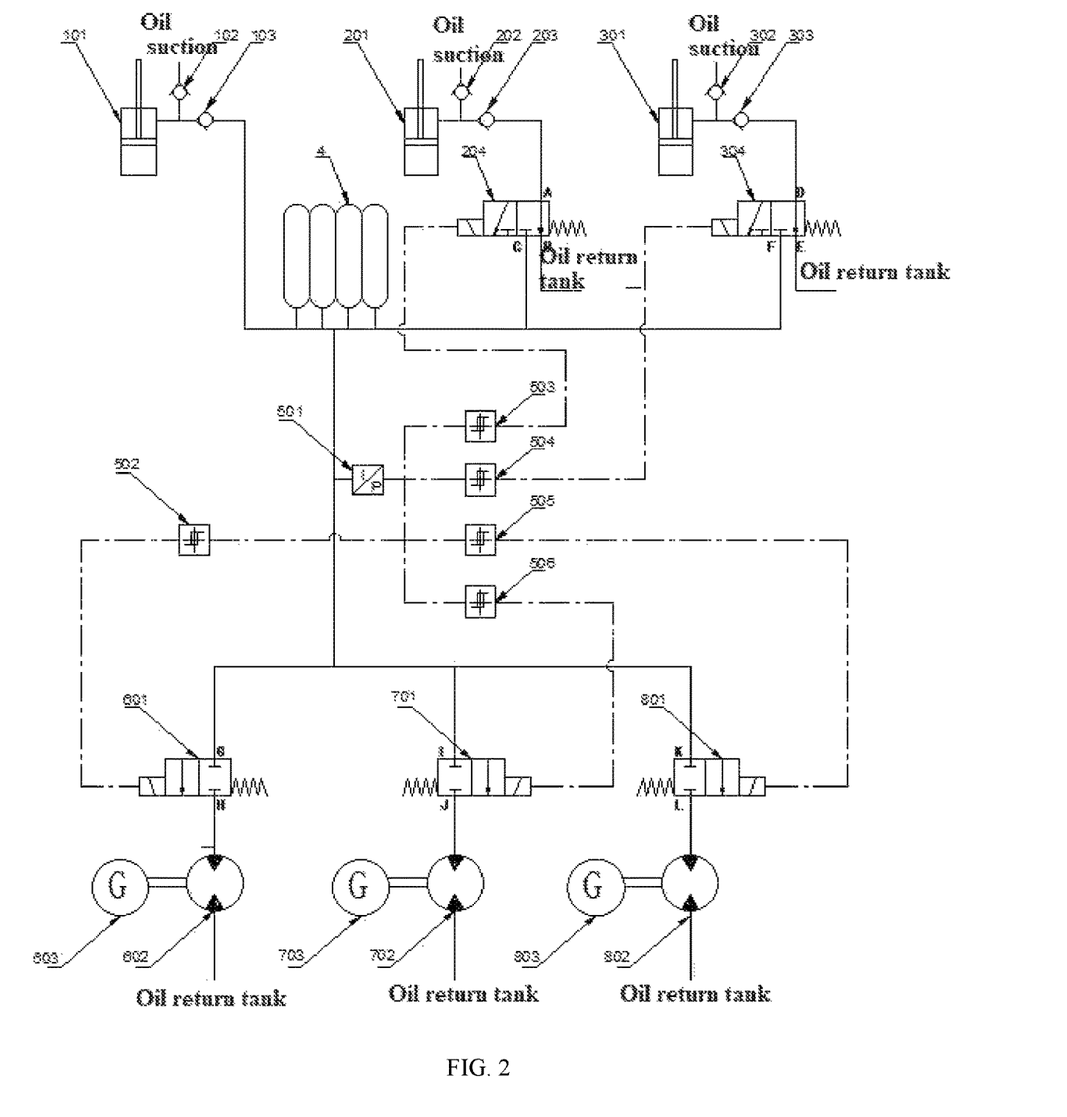
FIG. 2 is a schematic structural diagram of an indirect hydraulic load hierarchical control system for a wave energy device disclosed in Embodiment II of the present invention.

The present embodiment provides another indirect hydraulic load hierarchical control system for a wave energy device. On the basis of Embodiment I, connection relationships among the first hydraulic cylinder group 1, the second hydraulic cylinder group 2, the third hydraulic cylinder group 3, the high-pressure energy accumulator group 4, the pressure detection control module 5, the first hydraulic power generator set 6, the second hydraulic power generator set 7 and the third hydraulic power generator set 8 will be further explained below.

As shown in FIG. 2, the first hydraulic cylinder group 1 includes a first hydraulic cylinder 101, an input end of the first hydraulic cylinder 101 is connected with the oil return tank through a first check valve 102, and an output end of the first hydraulic cylinder 101 is connected with the output end of the high-pressure energy accumulator group 4 through a second check valve 103. The second hydraulic cylinder group 2 includes a second hydraulic cylinder 201, an input end of the second hydraulic cylinder 201 is connected with the oil return tank through a third check valve 202, an output end of the second hydraulic cylinder 201 is connected with an end A of a first two-position three-way reversing valve 204 through a fourth check valve 203, an end B of the first two-position three-way reversing valve 204 is connected with the oil return tank, and an end C of the first two-position three-way reversing valve 204 is connected with the input end of the high-pressure energy accumulator group 4. The third hydraulic cylinder group 3 includes a third hydraulic cylinder 301, an input end of the third hydraulic cylinder 3 is connected with the oil return tank through a fifth check valve 302, an output end of the third hydraulic cylinder 301 is connected with an end D of a second two-position three-way reversing valve 304 through a sixth check valve 303, an end E of the second two-position three-way reversing valve 304 is connected with the oil return tank, and an end F of the second two-position three-way reversing valve 304 is connected with the input end of the high-pressure energy accumulator group 4.

The first hydraulic power generator set 6 includes a first two-position two-way electromagnetic valve 601. An end G of the first two-position two-way electromagnetic valve 601 is connected with the output end of the high-pressure energy accumulator group 4, an end H of the first two-position two-way electromagnetic valve 601 is connected with an input end of a first hydraulic motor 602, and a controlled end of the first two-position two-way electromagnetic valve 601 is connected with a control end of the pressure detection control module 5. An output end of the first hydraulic motor 602 is connected with the oil return tank, and an output shaft of the first hydraulic motor 602 is connected with an input shaft of a first power generator 603.

The second hydraulic power generator set 7 includes a second two-position two-way electromagnetic valve 701. An end I of the second two-position two-way electromagnetic valve 701 is connected with the output end of the high-pressure energy accumulator group 4, an end J of the second two-position two-way electromagnetic valve 701 is connected with an input end of a second hydraulic motor 702, and a controlled end of the second two-position two-way electromagnetic valve 701 is connected with the control end of the pressure detection control module 5. An output end of the second hydraulic motor 702 is connected with the oil return tank, and an output shaft of the second hydraulic motor 702 is connected with an input shaft of a second power generator 703.

The third hydraulic power generator set 3 includes a third two-position two-way electromagnetic valve 801. An end K of the third two-position two-way electromagnetic valve 801 is connected with the output end of the high-pressure energy accumulator group 4, an end L of the third two-position two-way electromagnetic valve 801 is connected with an input end of a third hydraulic motor 802, and a controlled end of the third two-position two-way electromagnetic valve 801 is connected with the control end of the pressure detection control module 5. An output end of the third hydraulic motor 802 is connected with the oil return tank, and an output shaft of the third hydraulic motor 802 is connected with an input shaft of a third power generator 803.

The pressure detection control module 5 includes a pressure sensor 501. A detection end of the pressure sensor 501 is installed at the output end of the high-pressure energy accumulator group 4, a control end of the pressure sensor 501 is respectively connected with input ends of a first hysteresis comparator 502, a second hysteresis comparator 503, a third hysteresis comparator 504, a fourth hysteresis comparator 505 and a fifth hysteresis comparator 506, and output ends of the first hysteresis comparator 502, the second hysteresis comparator 503, the third hysteresis comparator 504, the fourth hysteresis comparator 505 and the fifth hysteresis comparator 506 are connected with the controlled ends of the first two-position two-way electromagnetic valve 601, the first two-position three-way reversing valve 204, the second two-position three-way reversing valve 304, the third two-position two-way electromagnetic valve 801 and the second two-position two-way electromagnetic valve 701 respectively.

Figure 3:
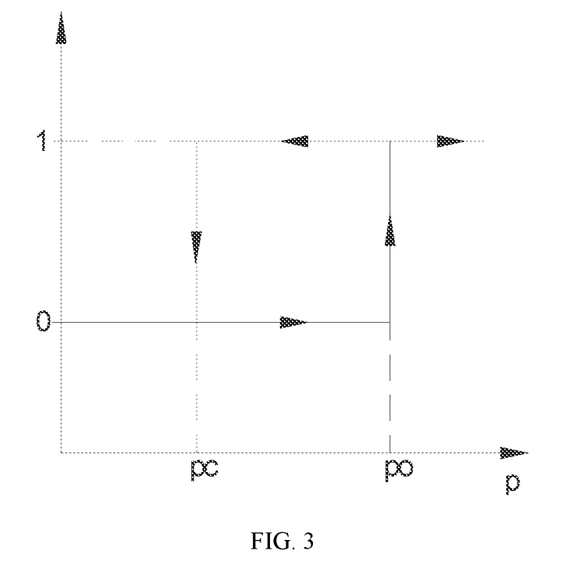
FIG. 3 is a control logic diagram of a hysteresis comparison controller.

Specifically, the control logic diagram of a hysteresis comparison controller is as shown in FIG. 3. In the control logic diagram of the hysteresis comparison controller, a pressure signal of the pressure sensor is received. In an initial state, which is a state 0, no voltage signal is output. When the pressure gradually rises to po, the voltage signal is output, which is a state 1, and if the pressure continues to rise, the state 1 is continued. When the pressure drops but does not reach pc, it is still the state 1. When the pressure drops to pc, the output of the voltage signal is stopped, which is the state 0, and the next cycle begins.

Embodiment III

The present embodiment provides. An indirect hydraulic load hierarchical control method for a wave energy device, which is used for the indirect hydraulic load hierarchical control system for the wave energy device according to Embodiment I and characterized by including:

acquiring an internal pressure P of the high-pressure energy accumulator group 4 in real time, and setting gradually increasing pressure values P1, P2, P3, P4, P5 and P6, and gradually increasing pressure values P21, P22, P31 and P32, wherein the following pressure relationships need to be met: P1<P21<P3<P31<P5 and P2<P22<P4<P32<P6.

The control method includes a first mode, a second mode, a third mode, a fourth mode and a fifth mode, and each mode may only be switched to an adjacent mode every time.

In the first mode, if P2≤P<P22, the second hydraulic cylinder group 2 and the third hydraulic cylinder group 3 are triggered to be connected to the oil return tank through the corresponding reversing valves, the electromagnetic valve corresponding to the first hydraulic power generator set 6 is turned on, the electromagnetic valves corresponding to the second hydraulic power generator set 7 and the third hydraulic power generator set 8 are turned off, and after P2≤P<P22 is triggered, the electromagnetic valve corresponding to the first hydraulic power generator set 6 is only allowed to be turned off only under the condition that P≤P1.

In the second mode, if P22≤P<P4, the second hydraulic cylinder group 2 is triggered to be connected to the input end of the high-pressure energy accumulator group 4 through the corresponding reversing valve, the third hydraulic cylinder group 3 is connected to the oil return tank through the corresponding reversing valve, the electromagnetic valve corresponding to the first hydraulic power generator set 6 is turned on, the electromagnetic valves corresponding to the second hydraulic power generator set 7 and the third hydraulic power generator set 8 are turned off, and after P22≤P<P4 is triggered, the second hydraulic cylinder group 2 is only allowed to be controlled to be connected to the oil return tank through the corresponding reversing valve only under the condition that P≤P21.

In the third mode, if P4≤P<P32, the second hydraulic cylinder group 2 is triggered to be connected to the input end of the high-pressure energy accumulator group 4 through the corresponding reversing valve, the third hydraulic cylinder group 3 is connected to the oil return tank through the corresponding reversing valve, the electromagnetic valves corresponding to the first hydraulic power generator set 6 and the second hydraulic power generator set 7 are turned on, the electromagnetic valve corresponding to the third hydraulic power generator set 8 is turned off, and after P4≤P<P32 is triggered, the electromagnetic valve corresponding to the second hydraulic power generator set 7 is only allowed to be turned off only under the condition that P≤P3.

In the fourth mode, if P32≤P<P6, the second hydraulic cylinder group 2 and the third hydraulic cylinder group 3 are triggered to be connected to the input end of the high-pressure energy accumulator group 4 through the corresponding reversing valves, the electromagnetic valves corresponding to the first hydraulic power generator set 6 and the second hydraulic power generator set 7 are turned on, the electromagnetic valve corresponding to the third hydraulic power generator set 8 is turned off, and after P32≤P<P6 is triggered, the third hydraulic cylinder group 3 is only allowed to be controlled to be connected to the oil return tank through the corresponding reversing valve only under the condition that P≤P31.

In the fifth mode, if P≥P6, the second hydraulic cylinder group 2 and the third hydraulic cylinder group 3 are triggered to be connected to the input end of the high-pressure energy accumulator group 4 through the corresponding reversing valves, the electromagnetic valves corresponding to the first hydraulic power generator set 6, the second hydraulic power generator set 7 and the third hydraulic power generator set 8 are turned on, and after P≥P6 is triggered, the electromagnetic valve corresponding to the third hydraulic power generator set 8 is only allowed to be turned off only under the condition that P≤P5.

In the present embodiment, by measuring the internal pressure P of the high-pressure energy accumulator group 4, the wave size is indirectly measured, and the hydraulic load size is independently adjusted according to the wave size, so that the one-stage energy conversion efficiency of the wave energy device can be improved. Moreover, the valves are not frequently opened and closed during the adjustment.

In the present embodiment, during the instantaneous change of wave impact, all hydraulic loads can be automatically loaded or unloaded, so that the wave energy device operates in a full load state or in an optimal energy conversion efficiency state, and the motion amplitude of a wave-absorbing floating body can be reduced, thereby reducing the probability of collision between the wave-absorbing floating body and a device base and protecting the wave energy device.

In addition, the method according to the present embodiment can be extended to the control of load increase and decrease of more hydraulic cylinders, and the hydraulic loads can be divided into more stages, so as to self-adapt to multiple wave conditions in the ocean.

Embodiment IV

The present embodiment provides another indirect hydraulic load hierarchical control method for a wave energy device, which is used for the indirect hydraulic load hierarchical control system for the wave energy device according to Embodiment II and includes: acquiring an internal pressure P of the high-pressure energy accumulator group 4 in real time through the pressure sensor 501, and setting gradually increasing pressure values P1, P2, P3, P4, P5 and P6, and gradually increasing pressure values P21, P22, P31 and P32, wherein the following pressure relationships need to be met: P1<P21<P3<P31<P5 and P2<P22<P4<P32<P6, wherein P1 and P2 are a lower threshold and an upper threshold of the first hysteresis comparator 502 respectively, P21 and P22 are a lower threshold and an upper threshold of the second hysteresis comparator 503 respectively, P31 and P32 are a lower threshold and an upper threshold of the third hysteresis comparator 504 respectively, P5 and P6 are a lower threshold and an upper threshold of the fourth hysteresis comparator 505 respectively, and P3 and P4 are a lower threshold and an upper threshold of the fifth hysteresis comparator 506 respectively.

The control method includes a first mode, a second mode, a third mode, a fourth mode and a fifth mode, and each mode may only be switched to an adjacent mode every time.

In the first mode, if P2≤P<P22, the first hysteresis comparator 502 is triggered to control the end G and the end H of the first two-position two-way electromagnetic valve 601 for communication, and after P2≤P<P22 is triggered, the first hysteresis comparator 502 is only allowed to disconnect the end G and the end H of the first two-position two-way electromagnetic valve 601 only under the condition that P≤P1.

In the second mode, if P22≤P<P4, the second hysteresis comparator 503 is triggered to control the end A and the end C of the first two-position three-way reversing valve 204 for communication, and after P22≤P<P4 is triggered, the second hysteresis comparator 503 is only allowed to disconnect the end A and the end C of the first two-position three-way reversing valve 204 only under the condition that P≤P21.

In the third mode, if P4≤P<P32, the fifth hysteresis comparator 506 is triggered to control the end I and the end J of the second two-position two-way electromagnetic valve 204 for communication, and after P4≤P<P32 is triggered, the fifth hysteresis comparator 506 is only allowed to disconnect the end I and the end J of the second two-position two-way electromagnetic valve 701 only under the condition that P≤P3.

In the fourth mode, if P32≤P<P6, the third hysteresis comparator 504 is triggered to control the end E and the end F of the second two-position three-way reversing valve 304 for communication, and after P32≤P<P6 is triggered, the third hysteresis comparator 504 is only allowed to controlled to disconnect the end E and the end F of the second two-position three-way reversing valve 304 only under the condition that P≤P31.

In the fifth mode, if P≥P6, the fourth hysteresis comparator 505 is triggered to control the end K and the end L of the third two-position two-way electromagnetic valve 801 for communication, and after P≥P6 is triggered, the fourth hysteresis comparator 505 is only allowed to disconnect the end K and the end L of the third two-position two-way electromagnetic valve 801 only under the condition that P≤P5.

After the first two-position two-way electromagnetic valve 601 is turned off, only the first hydraulic cylinder group 1 is involved in operation in the system. At this time, the system operates in an initial mode. In the initial mode, an oil outlet of the first hydraulic cylinder 101 is directly connected with the high-pressure energy accumulator group 4 for performing a normal energy storage and pressure stabilization process, and thus the first hydraulic cylinder 101 is in an effective work loading state. Oil outlets of the second hydraulic cylinder 201 and the third hydraulic cylinder 301 are communicated with the end A of the first two-position three-way reversing valve 204 and the end D of the second two-position three-way reversing valve 304 respectively. Valve cores of the first two-position three-way reversing valve 204 and the second two-position three-way reversing valve 304 are both in the right position, A and B are communicated, and D and E are communicated. The oil outlets of the second hydraulic cylinder 201 and the third hydraulic cylinder 301 are connected to a low-pressure oil path of the oil return tank, and the second hydraulic cylinder 201 and the third hydraulic cylinder 301 are in an ineffective work follow-up state. Meanwhile, in a full mode, the first hydraulic cylinder group 1 is always in operation, that is, uncontrolled.

Figure 4:
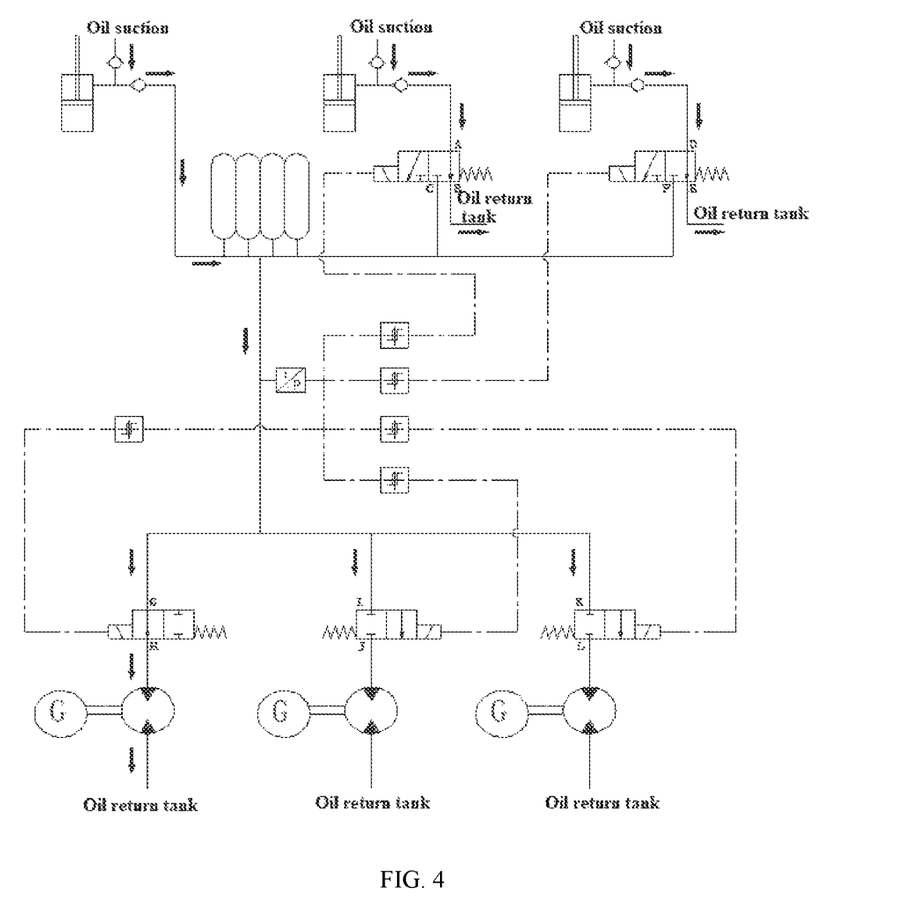
FIG. 4 is a schematic diagram of the operation of an indirect hydraulic load hierarchical control system for a wave energy device under a condition of small waves disclosed in Embodiment II of the present invention.

Specifically, under the condition of small waves, the first hydraulic cylinder 101 is in the loading state, and the second hydraulic cylinder group 2 and the third hydraulic cylinder group 3 are in the follow-up state. Due to driving of the small waves, the first hydraulic cylinder 101 has a relatively small stroke and a relatively low speed, the flow input to the high-pressure energy accumulator group 4 by the first hydraulic cylinder 101 is relatively small, the pressure of the high-pressure energy accumulator group 4 gradually increases, and a pressure signal is measured by the pressure sensor 501. When the pressure of the high-pressure energy accumulator group 4 rises to P2, the first hysteresis comparator 502 starts to be in the state 1. Therefore, there is a voltage signal input to the first two-position two-way electromagnetic valve 601, the valve core moves to the left, the end G and the end H are in a communication state, and a high-pressure hydraulic cylinder in the high-pressure energy accumulator group 4 releases the impact on the first hydraulic motor 602 to drive the first power generator 603 to work, as shown in FIG. 4. Since the flow of the first hydraulic cylinder 101 is less than that of the first hydraulic motor 602 under the condition of the small waves, that is, the input flow of the high-pressure energy accumulator group 4 is less than the output flow, the pressure of the high-pressure energy accumulator group 4 will immediately drop. When the pressure drops to P1, the first bysteresis comparator 502 is restored to the state 0, and no voltage signal is input to the first two-position two-way electromagnetic valve 601. Under the action of a reset spring, the valve core is restored to the right position, the end G and the end H are in a disconnected state, the first hydraulic motor 602 and the first power generator 603 stop working, and the energy accumulator starts the energy storage process of the next cycle. Therefore, under the condition of the small waves, the pressure of the high-pressure energy accumulator group 4 is never higher than P2, and only the first hydraulic cylinder 101 is in the loading state.

Figure 5:
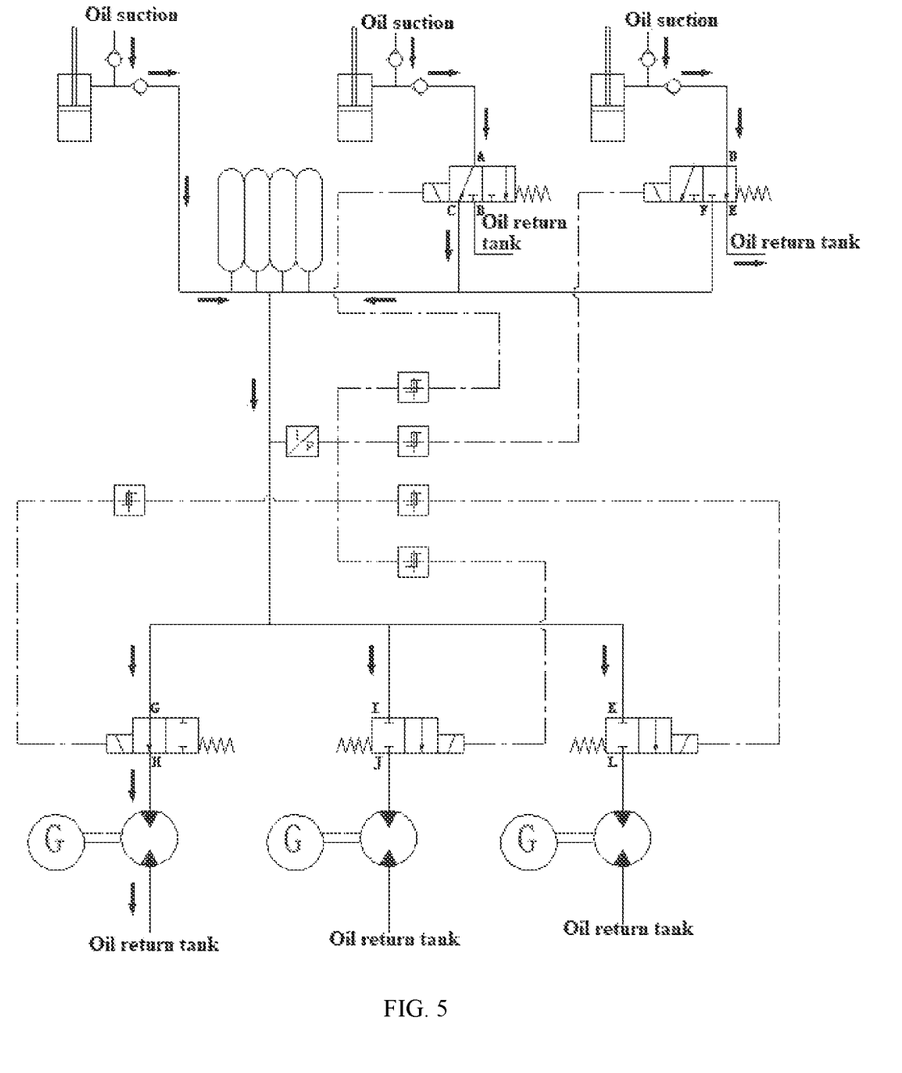
FIG. 5 is a schematic diagram of the operation of an indirect hydraulic load hierarchical control system for a wave energy device under a condition that the small waves are turned into medium waves disclosed in Embodiment II of the present invention.

Specifically, when the waves gradually increase and belong to medium waves, the stroke and speed of the first hydraulic cylinder 101 also increase accordingly, the flow input to the high-pressure energy accumulator group 4 by the first hydraulic cylinder 101 increases, the flow input to the energy accumulators by the first hydraulic cylinder 101 is greater than the flow of the first hydraulic motor 602, and the first hydraulic motor 602 will continue to work. At this time, although the first hydraulic motor 602 is always in an activated state, the pressure of the high-pressure energy accumulator group 4 will continue to increase. When the pressure of the high-pressure energy accumulator group 4 rises to P22, the second hysteresis comparator 503 starts to be in the state 1. Therefore, there is a voltage signal input to the first two-position three-way reversing valve 204, the valve core moves to the left, the end A and the end C are in the communication state, and the end B is disconnected. The oil outlet of the second hydraulic cylinder 201 will be communicated with the high-pressure energy accumulator group 4, and thus the second hydraulic cylinder 201 is in the effective work loading state. At this time, the second hydraulic cylinder 201 has realized independent loading, as shown in FIG. 5.

Specifically, at this time, both the first hydraulic cylinder 101 and the second hydraulic cylinder 201 are in the loading state, the sum of the flows of the first hydraulic cylinder 101 and the second hydraulic cylinder 201 into the high-pressure energy accumulator group 4 is greater than the flow of the first hydraulic motor 602, and the pressure of the high-pressure energy accumulator group 4 will continue to rise. When the pressure reaches P4, the fifth hysteresis comparator 506 starts to be in the state 1. Therefore, there is a voltage signal input to the second two-position two-way electromagnetic valve 701, the valve core moves to the left, the end I and the end J are in the communication state, and the high-pressure hydraulic cylinder in the high-pressure energy accumulator group 4 releases the impact on the second hydraulic motor 702 to drive the second power generator 703 to work. Under the condition of medium waves, both the first hydraulic cylinder 101 and the second hydraulic cylinder 201 are in the effective work state, and the sum of the flows input into the high-pressure energy accumulator group 4 by the two hydraulic cylinders is less than the sum of the flows of the first hydraulic motor 602 and the second hydraulic motor 702. Therefore, after the second hydraulic motor 702 is activated, the pressure of the high-pressure energy accumulator group 4 will drop. When the pressure drops to P3, the fifth hysteresis comparator 506 is restored to the state 0, and no voltage signal is input to the second two-position two-way electromagnetic valve 701. Under the action of the reset spring, the valve core is restored to the right position, and the end I and the end J are in the disconnected state. The second hydraulic motor 702 and the second power generator 703 stop working, and the pressure of the high-pressure energy accumulator group 4 starts to rise from P3 again. In this process, the pressure of the high-pressure energy accumulator group 4 will fluctuate within the range of P3 to P4, which is represented as that the first hydraulic motor 602 works continuously and the second hydraulic motor 702 works intermittently. The setting of the value of P22 needs to meet the condition that P2<P22<P4.

Figure 6:
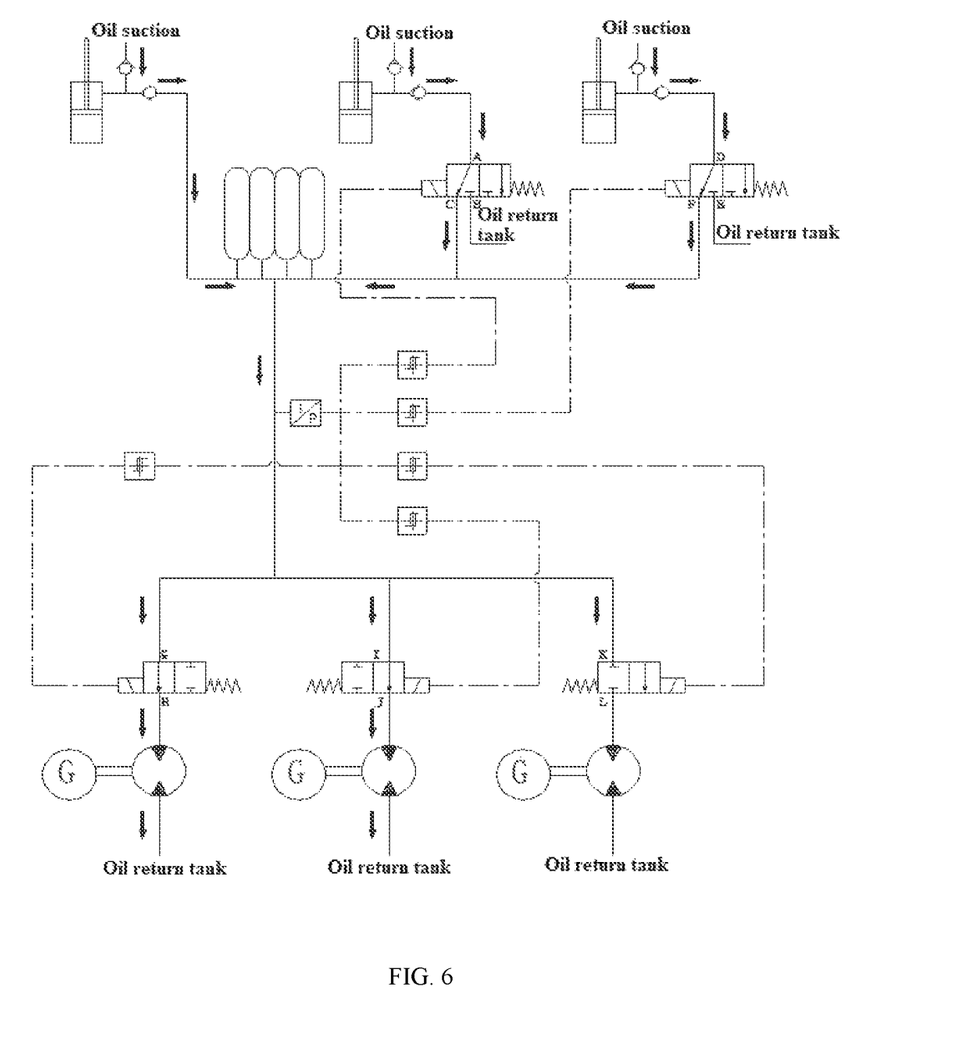
FIG. 6 is a schematic diagram of the operation of an indirect hydraulic load hierarchical control system for a wave energy device under a condition that the medium waves are turned into larger waves disclosed in Embodiment II of the present invention.

Specifically, when the incoming waves continue to increase and become larger waves, the movement strokes and speeds of the first hydraulic cylinder 101 and the second hydraulic cylinder 201 increase correspondingly, and the flow input to the high-pressure energy accumulator group 4 also increases correspondingly. The sum of the flows of the first hydraulic cylinder 101 and the second hydraulic cylinder 201 is greater than the sum of the flows of the first hydraulic motor 602 and the second hydraulic motor 702, and both the first hydraulic motor 602 and the second hydraulic motor 702 will continuously work. At this time, although the first hydraulic motor 602 and the second hydraulic motor 702 are always in the activated state, the pressure of the high-pressure energy accumulator group 4 will continue to rise. When the pressure of the high-pressure energy accumulator group 4 rises to P32, the third hysteresis comparator 504 starts to be in the state 1. Therefore, there is a voltage signal input to the second two-position three-way reversing valve 304, the valve core moves to the left, the end D and the end F are in the communication state, the end E is disconnected, and the oil outlet of the third hydraulic cylinder 301 will be communicated with the high-pressure energy accumulator group and the third hydraulic cylinder 301 is in the effective work loading state. At this time, the third hydraulic cylinder 301 also has realized independent loading, as shown in FIG. 6.

Figure 7:
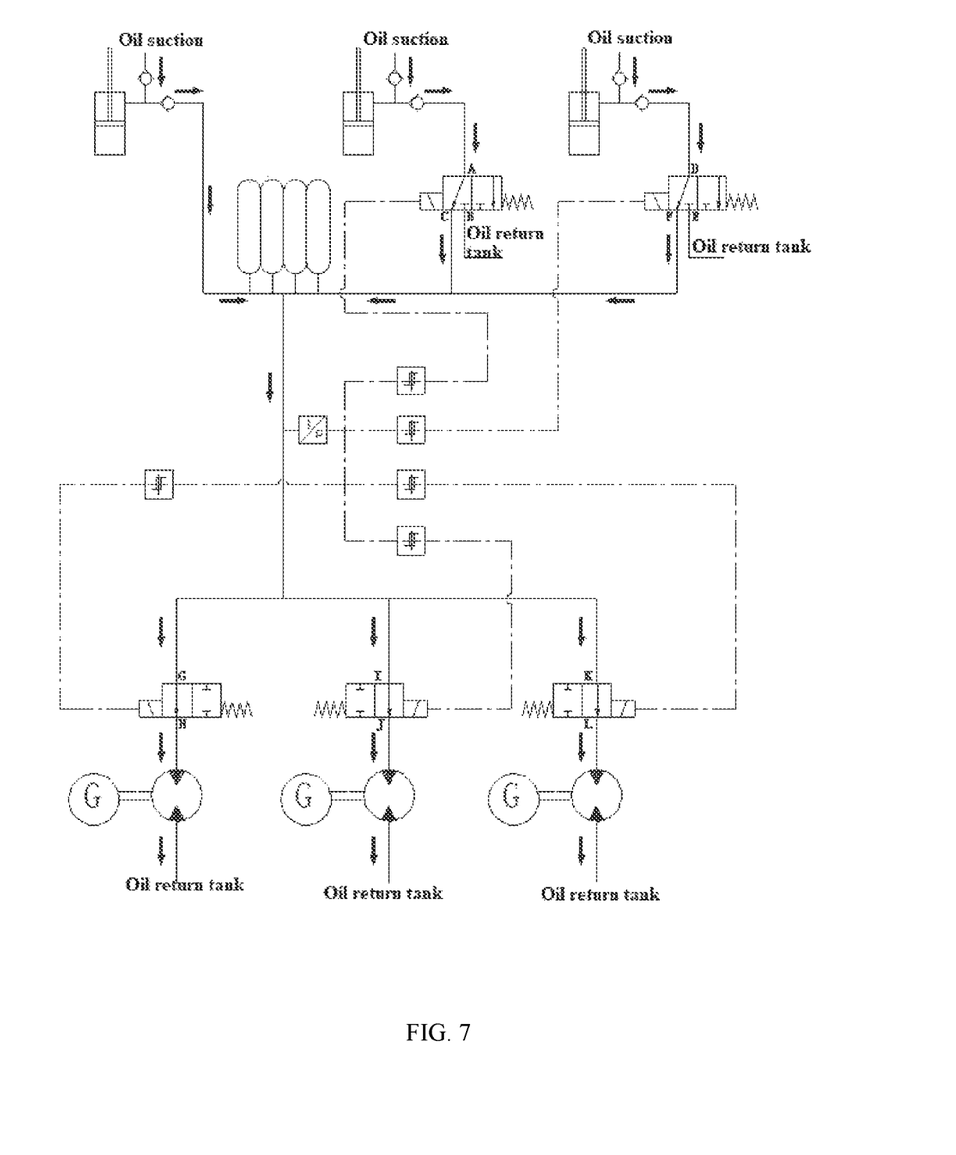
FIG. 7 is a schematic diagram of the operation of an indirect hydraulic load hierarchical control system for a wave energy device under a condition of the larger waves disclosed in Embodiment II of the present invention.

Specifically, when the first hydraulic cylinder 101, the second hydraulic cylinder 201 and the third hydraulic cylinder 301 are all in the loading state, the sum of the flows of the first hydraulic cylinder 101, the second hydraulic cylinder 201 and the third hydraulic cylinder 301 into the high-pressure energy accumulator group 4 is greater than the sum of the flows of the first hydraulic motor 602 and the second hydraulic motor 702, and the pressure of the high-pressure energy accumulator group 4 will continue to rise. When the pressure reaches P6, the fourth hysteresis comparator 505 starts to be in the state 1. Therefore, there is a voltage signal input to the third two-position two-way electromagnetic valve 801, the valve core moves to the left, the end K and the end L are in the communication state, and the high-pressure hydraulic cylinder of the high-pressure energy accumulator group 4 releases the impact on the third hydraulic motor 802 to drive the third power generator 803 to work, as shown in FIG. 7. Under the condition of the larger waves, the first hydraulic cylinder 101, the second hydraulic cylinder 201 and the third hydraulic cylinder 301 are all in the effective work state, and the sum of the flows input into the energy accumulator by the first hydraulic cylinder 101, the second hydraulic cylinder 201 and the third hydraulic cylinder 301 is less than the sum of the flows of the first hydraulic motor 602, the second hydraulic motor 702 and the third hydraulic motor 802. Therefore, after the third hydraulic motor 802 is activated, the pressure of the high-pressure energy accumulator group 4 will drop. When the pressure drops to P5, the fourth hysteresis comparator 505 is restored to the state 0, and no voltage signal is input to the third two-position two-way electromagnetic valve 801. Under the action of the reset spring, the valve core is restored to the right position, and the end K and the end L are in the disconnected state. The third hydraulic motor 802 and the third power generator 803 stop working, and the pressure of the high-pressure energy accumulator group 4 starts to rise from P5 again. In this process, the pressure of the high-pressure energy accumulator group 4 will fluctuate within the range of P5 to P6, which is represented as that the first hydraulic motor 602 and the second hydraulic motor 702 work continuously and the third hydraulic motor 802 works intermittently. The setting of the value of P32 needs to meet the condition that P4<P32<P6.

In the process from the small waves to the medium waves to the larger waves, the hydraulic loads are automatically loaded stage by stage.

When the larger waves are changed to the medium waves, the movement strokes and speeds of the first hydraulic cylinder 101, the second hydraulic cylinder 201 and the third hydraulic cylinder 301 will be reduced. When the sum of the flows input to the energy accumulator by the three hydraulic cylinders is less than the sum of the flows of the first hydraulic motor 602 and the second hydraulic motor 702, the pressure of the high-pressure energy accumulator group 4 cannot be maintained between P5 and P6, and the pressure of the high-pressure energy accumulator group 4 will continue to drop after the third hydraulic cylinder 301 stops working. When the pressure drops to P31, the third hysteresis comparator 504 starts to be in the state 0. Therefore, no voltage signal is input to the second two-position three-way reversing valve 304. Under the action of the reset spring, the valve core is restored to the right position, the end D and the end E are in the communication state, and the end F is disconnected. The oil outlet of the third hydraulic cylinder 301 is restored to be communicated with the low-pressure oil path of the oil return tank, and the third hydraulic cylinder 301 is in the ineffective work follow-up state. Thus, the three-stage loads are independently reduced to the two-stage loads. The pressure of the energy accumulator will keep fluctuating between P3 and P4, which is represented as that the first hydraulic motor 602 works continuously, the second hydraulic motor 702 works intermittently and the third hydraulic motor 802 does not work. The setting of the value of P31 needs to meet the condition that P3<P31<P5.

When the medium waves are changed to the small waves, the movement strokes and speeds of the first hydraulic cylinder 101 and the second hydraulic cylinder 201 will continue to decrease. When the sum of the flows input to the high-pressure energy accumulator group 4 by the first hydraulic cylinder 101 and the second hydraulic cylinder 201 is less than the flow of the first hydraulic motor 602, the pressure of the high-pressure energy accumulator group 4 cannot be maintained between P3 and P4, and the pressure of the energy accumulators will continue to decrease after the second hydraulic motor 702 stops working. When the pressure drops to P21, the hysteresis comparison controller 2 starts to be in the state 0. Therefore, no voltage signal is input to the first two-position three-way reversing valve 204. Under the action of the reset spring, the valve core is restored to the right position, the end A and the end B are in the communication state, the end C is disconnected, and the oil outlet of the second hydraulic cylinder 201 is also restored to be communicated with the low-pressure oil path of the oil return tank, and the second hydraulic cylinder 201 is in the ineffective work follow-up state. Thus, the two-stage loads are independently reduced to the one-stage load. The pressure of the high-pressure energy accumulator group 4 will keep fluctuating between P1 and P2, which is represented as that the first hydraulic motor 602 works intermittently and the second hydraulic motor 702 and the third hydraulic motor 802 do not work. The setting of the value of P21 needs to meet the condition that P1<P21<P3.

In the process from the larger waves to the medium waves to the small waves, the hydraulic loads are automatically unloaded stage by stage.

The above embodiments describe that respective hydraulic cylinders and respective hydraulic motors realize the automatic increase of the hydraulic loads stage by stage in the process from the small waves to the medium waves to the larger waves, and realize the automatic decrease of the hydraulic loads stage by stage in the process from the larger waves to the medium waves to the small waves, and each mode can only be switched to the adjacent mode every time. One lower threshold and one upper threshold are set for each hysteresis comparator, so that the hysteresis comparator will not switch the reversing valve or electromagnetic valve immediately, thereby ensuring smooth mode switching and high energy conversion efficiency.

The foregoing embodiments are only intended for explaining the technical concepts and characteristics of the present invention, and aim to enable those ordinary skilled in the art to understand the content of the present invention and implement the same accordingly, without limiting the protection scope of the present invention. All equivalent changes or modifications made according to the essence of the present invention should be included in the protection scope of the present invention.

What is claimed is:

1. An indirect hydraulic load hierarchical control method for a wave energy device, being used for an indirect hydraulic load hierarchical control system for the wave energy device, wherein the indirect hydraulic load hierarchical control system comprises:

a first hydraulic cylinder group, a second hydraulic cylinder group, a third hydraulic cylinder group, a high-pressure energy accumulator group, a pressure detection control module, a first hydraulic power generator set, a second hydraulic power generator set and a third hydraulic power generator set, wherein an output end of the first hydraulic cylinder group is directly connected with an input end of the high-pressure energy accumulator group, an output end of the second hydraulic cylinder group and an output end of the third hydraulic cylinder group are connected with the input end of the high-pressure energy accumulator group and an oil return tank respectively through independent reversing valves, an output end of the high-pressure energy accumulator group is respectively connected with the first hydraulic power generator set, the second hydraulic power generator set and the third hydraulic power generator set through independent electromagnetic valves, a detection end of the pressure detection control module is used for acquiring an internal pressure of the high-pressure energy accumulator group, comparing the internal pressure with a preset pressure level, and respectively controlling the on-off of the reversing valves and the electromagnetic valves according to a comparison result, the reversing valves are used for controlling the second hydraulic cylinder group and the third hydraulic cylinder group to enter/exit an effective work state, and the electromagnetic valves are used for controlling the first hydraulic power generator set, the second hydraulic power generator set and the third hydraulic power generator set to enter/exit a power generation state; and the indirect hydraulic load hierarchical control method comprising:

acquiring an internal pressure P of the high-pressure energy accumulator group in real time, and setting gradually increasing pressure values P1, P2, P3, P4, P5 and P6 and gradually increasing pressure values P21, P22, P31 and P32, wherein the following pressure relationships need to be met: P1<P21<P3<P31<P5 and P2<P22<P4<P32<P6;

the control method comprises a first mode, a second mode, a third mode, a fourth mode, and a fifth mode, and each mode may only be switched to an adjacent mode every time;

in the first mode, if $P2 \leq P < P22$, the second hydraulic cylinder group and the third hydraulic cylinder group are triggered to be connected to the oil return tank through the corresponding reversing valves, the electromagnetic valve corresponding to the first hydraulic power generator set is turned on, the electromagnetic valves corresponding to the second hydraulic power generator set and the third hydraulic power generator set are turned off, and after $P2 \leq P < P22$ is triggered, the electromagnetic valve corresponding to the first hydraulic power generator set is only allowed to be turned off only under the condition that $P \leq P1$;

in the second mode, if $P22 \leq P < P4$, the second hydraulic cylinder group is triggered to be connected to the input end of the high-pressure energy accumulator group through the corresponding reversing valve, the third hydraulic cylinder group is connected to the oil return tank through the corresponding reversing valve, the electromagnetic valve corresponding to the first hydraulic power generator set is turned on, the electromagnetic valves corresponding to the second hydraulic power generator set and the third hydraulic power generator set are turned off, and after $P22 \leq P < P4$ is triggered, the second hydraulic cylinder group is only allowed to be controlled to be connected to the oil return tank through the corresponding reversing valve only under the condition that $P \leq P21$;

in the third mode, if $P4 \leq P < P32$, the second hydraulic cylinder group is triggered to be connected to the input end of the high-pressure energy accumulator group through the corresponding reversing valve, the third hydraulic cylinder group is connected to the oil return tank through the corresponding reversing valve, the electromagnetic valves corresponding to the first hydraulic power generator set and the second hydraulic power generator set are turned on, the electromagnetic valve corresponding to the third hydraulic power generator set is turned off, and after $P4 \leq P < P32$ is triggered, the electromagnetic valve corresponding to the second hydraulic power generator set is only allowed to be turned off only under the condition that $P \leq P3$;

in the fourth mode, if $P32 \leq P < P6$, the second hydraulic cylinder group and the third hydraulic cylinder group are triggered to be connected to the input end of the high-pressure energy accumulator group through the corresponding reversing valves, the electromagnetic valves corresponding to the first hydraulic power generator set and the second hydraulic power generator set are turned on, the electromagnetic valve corresponding to the third hydraulic power generator set is turned off, and after $P32 \leq P < P6$ is triggered, the third hydraulic cylinder group is only allowed to be controlled to be connected to the oil return tank through the corresponding reversing valve only under the condition that $P \leq P31$; and in the fifth mode, if $P \geq P6$, the second hydraulic cylinder group and the third hydraulic cylinder group are triggered to be connected to the input end of the high-pressure energy accumulator group through the corresponding reversing valves, the electromagnetic valves corresponding to the first hydraulic power generator set, the second hydraulic power generator set and the third hydraulic power generator set are turned on, and after $P \geq P6$ is triggered, the electromagnetic valve corresponding to the third hydraulic power generator set is only allowed to be turned off only under the condition that $P \leq P5$.

2. An indirect hydraulic load hierarchical control method for a wave energy device, being used for an indirect hydraulic load hierarchical control system for the wave energy device, wherein the indirect hydraulic load hierarchical control system comprises:

a first hydraulic cylinder group, a second hydraulic cylinder group, a third hydraulic cylinder group, a high-pressure energy accumulator group, a pressure detection control module, a first hydraulic power generator set, a second hydraulic power generator set and a third hydraulic power generator set, wherein an output end of the first hydraulic cylinder group is directly connected with an input end of the high-pressure energy accumulator group, an output end of the second hydraulic cylinder group and an output end of the third hydraulic cylinder group are connected with the input end of the high-pressure energy accumulator group and an oil return tank respectively through independent reversing valves, an output end of the high-pressure energy accumulator group is respectively connected with the first hydraulic power generator set, the second hydraulic power generator set and the third hydraulic power generator set through independent electromagnetic valves, a detection end of the pressure detection control module is used for acquiring an internal pressure of the high-pressure energy accumulator group, comparing the internal pressure with a preset pressure level, and respectively controlling the on-off of the reversing valves and the electromagnetic valves according to a comparison result, the reversing valves are used for controlling the second hydraulic cylinder group and the third hydraulic cylinder group to enter/exit an effective work state, and the electromagnetic valves are used for controlling the first hydraulic power generator set, the second hydraulic power generator set and the third hydraulic power generator set to enter/exit a power generation state;

the first hydraulic cylinder group comprises a first hydraulic cylinder, wherein an input end of the first hydraulic cylinder is connected with the oil return tank through a first check valve and an output end of the first hydraulic cylinder is connected with the output end of the high-pressure energy accumulator group through a second check valve; the second hydraulic cylinder group comprises a second hydraulic cylinder, wherein an input end of the second hydraulic cylinder is connected with the oil return tank through a third check valve, an output end of the second hydraulic cylinder is connected with an end A of a first two-position three-way reversing valve through a fourth check valve, an end B of the first two-position three-way reversing valve is connected with the oil return tank, and an end C of the first two-position three-way reversing valve is connected with the input end of the high-pressure energy accumulator group; the third hydraulic cylinder group comprises a third hydraulic cylinder, an input end of the third hydraulic cylinder is connected with the oil return tank through a fifth check valve, an output end of the third hydraulic cylinder is connected with an end D of a second two-position three-way reversing valve through a sixth check valve, an end E of the second two-position three-way reversing valve is connected with the oil return tank, and an end F of the second two-position three-way reversing valve is connected with the input end of the high-pressure energy accumulator group;

the first hydraulic power generator set comprises a first two-position two-way electromagnetic valve, wherein an end G of the first two-position two-way electromagnetic valve is connected with the output end of the high-pressure energy accumulator group, an end H of the first two-position two-way electromagnetic valve is connected with an input end of a first hydraulic motor, a controlled end of the first two-position two-way electromagnetic valve is connected with a control end of the pressure detection control module, an output end of the first hydraulic motor is connected with the oil return tank, and an output shaft of the first hydraulic motor is connected with an input shaft of a first power generator;

the second hydraulic power generator set comprises a second two-position two-way electromagnetic valve, an end I of the second two-position two-way electromagnetic valve is connected with the output end of the high-pressure energy accumulator group, an end J of the second two-position two-way electromagnetic valve is connected with an input end of a second hydraulic motor, a controlled end of the second two-position two-way electromagnetic valve is connected with the control end of the pressure detection control module, an output end of the second hydraulic motor is connected with the oil return tank, and an output shaft of the second hydraulic motor is connected with an input shaft of a second power generator;

the third hydraulic power generator set comprises a third two-position two-way electromagnetic valve, an end K of the third two-position two-way electromagnetic valve is connected with the output end of the high-pressure energy accumulator group, an end L of the third two-position two-way electromagnetic valve is connected with an input end of a third hydraulic motor, a controlled end of the third two-position two-way electromagnetic valve is connected with the control end of the pressure detection control module, an output end of the third hydraulic motor is connected with the oil return tank, and an output shaft of the third hydraulic motor is connected with an input shaft of a third power generator;

the pressure detection control module comprises a pressure sensor, a detection end of the pressure sensor is installed at the output end of the high-pressure energy accumulator group, a control end of the pressure sensor is respectively connected with input ends of a first hysteresis comparator, a second hysteresis comparator, a third hysteresis comparator, a fourth hysteresis comparator and a fifth hysteresis comparator, and output ends of the first hysteresis comparator, the second hysteresis comparator, the third hysteresis comparator, the fourth hysteresis comparator and the fifth hysteresis comparator are connected with the controlled ends of the first two-position two-way electromagnetic valve, the first two-position three-way reversing valve, the second two-position three-way reversing valve, the third two-position two-way electromagnetic valve and the second two-position two-way electromagnetic valve respectively;

acquiring an internal pressure P of the high-pressure energy accumulator group in real time through the pressure sensor, and setting gradually increasing pressure values P1, P2, P3, P4, P5 and P6, and gradually increasing pressure values P21, P22, P31 and P32, wherein the following pressure relationships need to be met: P1<P21<P3<P31<P5 and P2<P22<P4<P32<P6, wherein P1 and P2 are a lower threshold and an upper threshold of the first hysteresis comparator respectively, P21 and P22 are a lower threshold and an upper threshold of the second hysteresis comparator respectively, P31 and P32 are a lower threshold and an upper threshold of the third hysteresis comparator respectively, P5 and P6 are a lower threshold and an upper threshold of the fourth hysteresis comparator respectively, and P3 and P4 are a lower threshold and an upper threshold of the fifth hysteresis comparator respectively;

the control method comprises a first mode, a second mode, a third mode, a fourth mode, and a fifth mode, and each mode may only be switched to an adjacent mode every time;

in the first mode, if $P2 \leq P < P22$, the first hysteresis comparator is triggered to control the end G and the end H of the first two-position two-way electromagnetic valve to be communicated, and after $P2 \leq P < P22$ is triggered, the first hysteresis comparator is only allowed to disconnect the end G and the end H of the first two-position two-way electromagnetic valve only under the condition that $P \leq P1$;

in the second mode, if $P22 \leq P < P4$, the second hysteresis comparator is triggered to control the end A and the end C of the first two-position three-way reversing valve to be communicated, and after $P22 \leq P < P4$ is triggered, the second hysteresis comparator is only allowed to disconnect the end A and the end C of the first two-position three-way reversing valve only under the condition that $P \leq P21$;

in the third mode, if $P4 \leq P < P32$, the fifth hysteresis comparator is triggered to control the end I and an end J of the second two-position two-way electromagnetic valve to be communicated, and after $P4 \leq P < P32$ is triggered, the fifth hysteresis comparator is only allowed to disconnect the end I and the end J of the second two-position two-way electromagnetic valve only under the condition that $P \leq P3$;

in the fourth mode, if $P32 \leq P < P6$, the third hysteresis comparator is triggered to control the end E and the end F of the second two-position three-way reversing valve to be communicated, and after $P32 \leq P < P6$ is triggered, the third hysteresis comparator is only allowed to be controlled to disconnect the end E and the end F of the second two-position three-way reversing valve only under the condition that $P \leq P31$; and in the fifth mode, if $P \geq P6$, the fourth hysteresis comparator is triggered to control the end K and the end L of the third two-position two-way electromagnetic valve to be communicated, and after $P \geq P6$ is triggered, the fourth hysteresis comparator is only allowed to disconnect the end K and the end L of the third two-position two-way electromagnetic valve only under the condition that $P \leq P5$.

* * * * *